(No Model.) 2 Sheets—Sheet 1.
J. BURNS.
CASH AND PARCEL CARRIER.
No. 309,520. Patented Dec. 23, 1884.
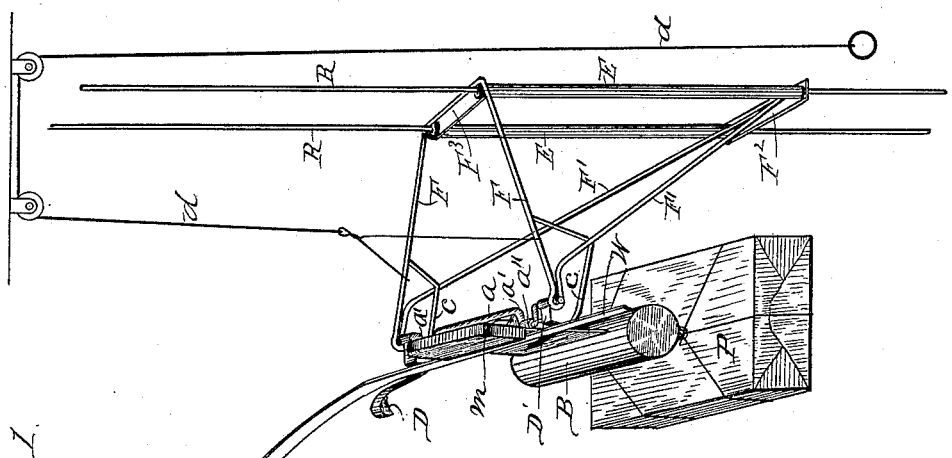
Fig. 1.
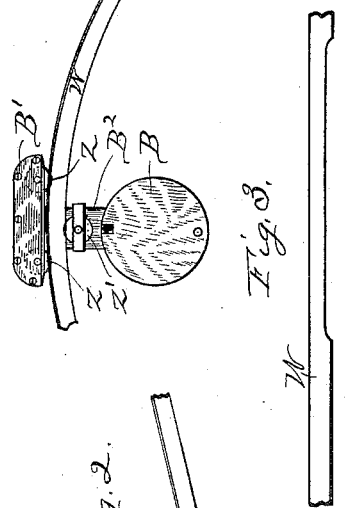
Fig. 3.
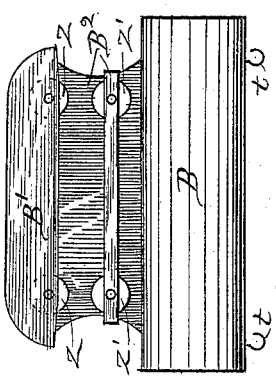
Fig. 5.
Fig. 4.
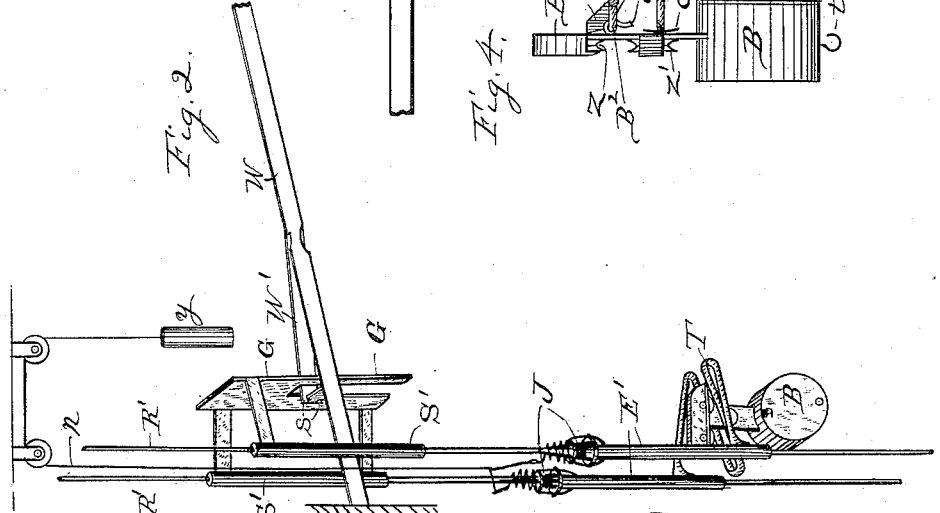
Fig. 2.
Witnesses: Thos. H. Hutchins, Wm. J. Hutchins.
Inventor: James Burns.

(No Model.)   2 Sheets—Sheet 2.
J. BURNS.
CASH AND PARCEL CARRIER.
No. 309,520. Patented Dec. 23, 1884.
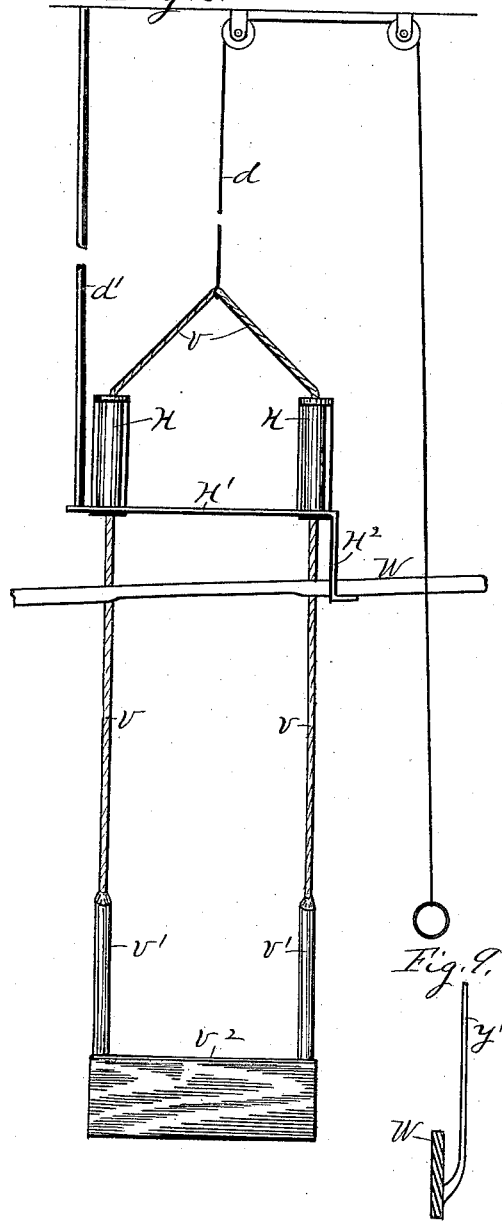
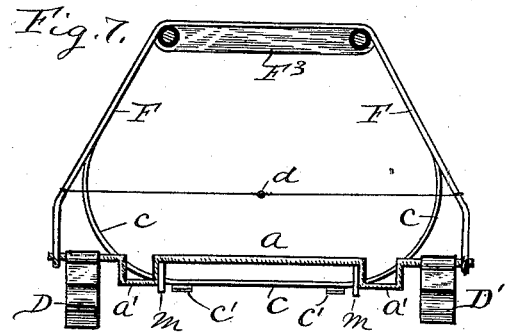
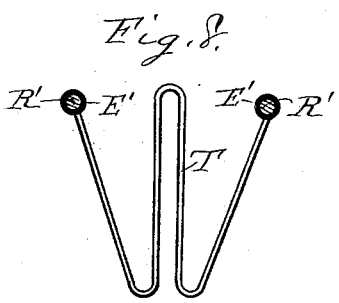
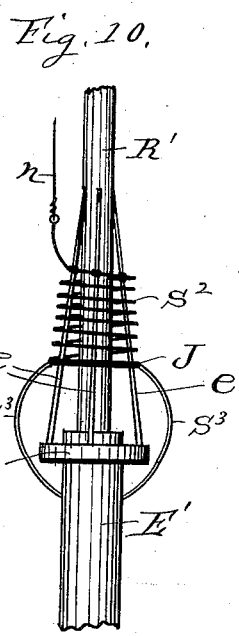
Witnesses.
Thos. H. Hutchins.
Wm. J. Hutchins.
Inventor.
James Burns

UNITED STATES PATENT OFFICE.

JAMES BURNS, OF CHICAGO, ILLINOIS.

CASH AND PARCEL CARRIER.

SPECIFICATION forming part of Letters Patent No. 309,520, dated December 23, 1884.

Application filed October 6, 1884. (No model.)

*To all whom it may concern:*

Be it known that I, JAMES BURNS, a citizen of the United States of America, residing at Chicago, in the county of Cook and State of Illinois, have invented certain new and useful Improvements in Cash and Parcel Carriers, of which the following is a specification, reference being had therein to the accompanying drawings.

Figure 1 is a perspective view of the carriage for elevating the cash-carrying box to and placing it on the suspended wire track, and showing the manner in which a large parcel may be attached and elevated with the cash-carrying box, and this view also shows a portion of the flat-wire track used in this invention, and also a front view of a cash-box on the track-wire. Fig. 2 is a perspective view of the cash-carrying-box deliverer, and of the bumper for preventing more than one cash-box from descending at one time, and also shows a switch for conducting the carrying-boxes from the main-track wire to the delivering-carriage. Fig. 3 is a side view of a section of the flat-track wire, showing a portion of its lower edge cut away at the place where the cash-carriers are to be placed on it to make it narrow enough, so it may pass between the wheels of the carrier, to permit it to be placed on said track-wire. Fig. 4 is a side view of one of the cash-carriers, showing the grooves in its wheels, and also a portion of the elevating-carriage, showing how the cash-carrier is attached to it. Fig. 5 is a front view of a large double cash-carrying box. Fig. 6 is a front view of the cash-box elevator; Fig. 7, a top plan view of the cash-box and parcel elevator; Fig. 8, a plan view on the top of the delivering-carriage; Fig. 9, a cross-sectional view of the flat track-wire, showing how its suspending rods or wires are attached thereto; and Fig. 10, a side view of the friction-grip used in connection with the delivering-carriage for governing the speed of the carriage when delivering parcels of varying weights.

This invention relates to certain improvements in cash and parcel carriers for use in stores, which improvements are fully described in the following specification and claims.

Referring to the drawings, F, Figs. 1 and 7, represents the frame of the cash-box elevator. This frame has the braces F' and tubular slides E, adapted to slide vertically on the rods R, for the purpose of elevating and lowering it from the counter to the track. The front part of frame F is provided with the crank-shaft $a$, having the cranks $a'$ and lugs $m$, and also the spring-arms D D', for gathering in the track-wire, so it may be brought between the wheels of the cash-carrier. This frame F also has attached to it the frame $c$, having the bumpers $c'$, for the purpose of holding the cash-carrier in a vertical position, so its wheels may be placed on the track-wire, as shown in Figs. 1 and 4. The carriage F is elevated and lowered by means of the cord $d$, passing over pulleys on the ceiling. The cash-carriers are provided with hooks on their rear side, which hook in the cranks $a'$ of the rod $a$, as shown in Figs. 1 and 4. The lug $m$ and the bumper $c'$ hold the carrier vertically, as shown in said figures as it is being elevated. When it has reached the track-wire W, the gathering-arms will gather the track-wire in and bring it in between the wheels Z Z' (shown more clearly in Fig. 5) as the track is narrowed, as shown in Fig. 3, at the elevator, where the carrier is to be placed on it. After the carrier is so placed on the track and its weight rests thereon, the crank-shaft $a$ will roll over forward, so the cranks $a'$ and the gathering-arms D D' will hang down and be out of the way of any other carrier that may be coming along on the track. As the track descends a little, so the carriers will run along on it on account of their own gravity. These elevators can be used at any place along the line of the track-wire, to place a carrier on it at any place and not be in the way of any other elevator or carrier. The form of the elevator is such that neither the cash-box or parcels P, attached to it, will come in contact with it, as shown in Fig. 1. The track-wire W is flat, so it will turn a corner readily, and of a sufficient width to fill the space between the grooved wheels Z Z', so it cannot get out and permit the carrier to jump the track. Two sizes of carriers are shown—one with four wheels, as shown in Fig. 5, and one with three wheels, as shown in Figs. 1 and 4. When the carrier is hooked on the cranks $a'$, the lugs $m$ $m$ rest against the carrier and prevent the cranks from turning down, and the bumper c' and bar c hold the carrier out, so it will hang perpendicularly, as shown in Fig. 4, until it is placed on the track-wire, as stated. When a large carrier is used, having two hooks, a'', on its rear side, a hook is hooked on each crank, as shown in Fig. 1; and when a carrier having but one hook on its rear side is used, the hook is hooked on one of the cranks, so the elevator will deposit either sized carrier on the track without change in form or construction. In Fig. 1 the two cross-bars F² F³ are used to connect the ends of the tubular slides E, to give strength and permanency to the frame. The delivering end of the track-wire (shown in Fig. 2) is provided with a delivering-carriage, T, attached to a pair of tubes, E', that slide on the vertical rods R' R', and is counterbalanced by the weight y, connected to said carriage by the cord n, passing over a pair of pulleys secured to the ceiling. A plan view of this carriage is shown in Fig. 8 to more clearly show its form. The weight y will hold the carriage T up next the track-wire when no carrier is on it. On the vertical rods R' R, above the tubes E' of the said carriage, is another pair of tubes, S', having attached to them a bumper, G, by means of extending arms, as shown in Fig. 2. This bumper is elevated by means of the carriage-tubes E' when the carriage is up next the track-wire and out of the way, so that when a carrier comes down the track it will run off on the switch W', and be deposited on the carrier T, as shown in Fig. 2, its weight causing said carriage to descend to the counter below. When the carriage is descending, as shown in said figure, another carrier might come to the end of the switch to be delivered and fall, were it not for the bumper G, when it is in the position shown in said figure. The said bumper will arrest any carrier or number of carriers that may come until the carriage T ascends to carry it up out of the way, when any carrier so held arrested by said bumper will run off onto said carriage and descend, as the one before it, permitting only one to descend at one time. The main-track wire W is cut away at its juncture with the switch W', so the flanges of the wheels can pass the main track and permit the carriage to run on the switch. The outer end of the switch W' is connected with the main track by the bar S, to support and hold the outer end of the switch, which bar S is notched, so the flanges of the wheels may pass it.

In order to prevent the carriage T from descending with too great force when a heavy weight is on it, or with a heavy parcel, it is provided with friction-grips, which are shown in detail in Fig. 10.

To the upper end of each tubular slide E' is secured an annular ring or collar, b, having a row of fingers, e, secured in it, and standing so as to extend upward and surround the rods R'. Surrounding these fingers at about their center is placed the conical-shaped coil-spring S², to the lower end of which the tubes E' attach by means of the bails S³ at the lower ring, J, of said springs. The cord n attaches to the upper end of said springs, and the upper ends of said springs attach to about two of the fingers e. A weight on the carriage T must pull on and draw the ring J of the springs down along the fingers e, and contract their upper ends to grip the rods R', causing the carriage to descend with less rapidity than it would with no such grip. The greater the weight on the carriage the more the fingers e will grip the rods R', to hold the weight from descending too rapidly, thus acting as a sort of governor to regulate the velocity at which the carriage may descend with varying weights on it.

Fig. 6 shows another form of carriage, for elevating the carriers at the end of the line at a place where it can be attached to the track-wire, and consists of the cross-bar v², attached to a pair of vertical bars or rods, v' v', to the upper ends of which are secured the cords v v, which pass on up through the tubes H H, held apart by the cross-bar H', and connect to the cord d, having a counterbalance-weight at the end, and passing over a pair of pulleys on the ceiling. The track-wire W passes through the depending arm H² of cross-bar H', to secure it to the said wire. The cash-carrier may be hooked on the cross-bar v², and elevated by means of cord d. The rods v' will enter the tubes H as the cords v draw them up, so as to hold the parts together, so as to draw the carrier against the track W and deposit it thereon.

Fig. 9 shows how the track-wire W is suspended. The suspender-rod y' is secured to one side of the track-wire far enough from either edge so as not to be in the way of the flanges of the wheels of the carriers, and in such manner that the wire can turn in a curve.

Having thus described my invention, what I claim as new, and desire to secure by Letters Patent, is as follows, to wit:

1. In a cash and parcel carrier, the combination of the carriage consisting of the frame F, braces F', bumper c', rod c, crank-shaft a, having the cranks a', and lugs m, with the rods R R, flat track-wire W, and the means, substantially as described, for elevating and lowering said carriage, as and for the purpose set forth.

2. In a cash and parcel carrier, the flat track-wire W, having the narrow portion for adapting it to be attached to the cash-carriers, and provided with the switch W', in combination with the bumper G and carrier B B', as and for the purpose set forth.

3. In combination with the flat track-wire, the bumper G S', rods R' R', and carriage E' T, cord n, and weight y, as and for the purpose set forth.

4. A cash and parcel carrier provided with the grooved wheels to engage with both the upper and lower edge of a flat metal track, in the manner substantially as and for the purpose set forth.

5. In the cash and parcel carrier described, the track W, having the switch W', supported at its inner end by attaching it directly to the main-track wire, so their tread-edges will meet, and by the notched bar S at its outer end, to hold it apart from the main-track wire, as and for the purpose set forth.

6. In the cash and parcel carrier described, the delivering-carriage T, adapted to catch and lower the cash-carrier and parcel, in combination with the means described for governing its descending speed, as and for the purpose set forth.

7. In the cash and parcel carrier described, the bumper G, supported by means of the cord $n$ and weight $y$ through the medium of the tubular slides E' of delivering-carriage T, and adapted to be let down to arrest the cash-carriers from running off the switch while the carriage T is down, delivering a cash-carrier in the manner substantially as set forth.

8. In the cash and parcel carrier described, the friction-grip constructed substantially as set forth, in combination with the tubular slides E' of the delivering-carriage T, and guide-rods R', for the purpose set forth.

9. In the cash and parcel carrier described, the elevating-carriage constructed substantially as set forth, and adapted to be elevated with a cash-carrier to place it upon the track, in the manner substantially as and for the purpose set forth.

JAMES BURNS.

Witnesses:
THOMAS CAREY,
B. VAN BUREN.